US011429595B2

(12) United States Patent
Vishwakarma et al.

(10) Patent No.: US 11,429,595 B2
(45) Date of Patent: Aug. 30, 2022

(54) PERSISTENCE OF WRITE REQUESTS IN A DATABASE PROXY

(71) Applicant: Marvell Asia Pte, Ltd., Singapore (SG)

(72) Inventors: Amarnath Vishwakarma, Hyderabad (IN); Syam Prasad, Hyderabad (IN); Murali Krishna, Andhra Pradesh (IN); Ashutosh Sharma, Hyderabad (IN); Kuladeep Sai Reddy, Hyderabad (IN); Vaibhav Jain, Rajasthan (IN); Prasanna Sukumar, Pleasanton, CA (US); Chidamber Kulkarni, Richmond (CA); Prasanna Sundararajan, Palo Alto, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 77 days.

(21) Appl. No.: 16/837,966

(22) Filed: Apr. 1, 2020

(65) Prior Publication Data

US 2021/0311930 A1 Oct. 7, 2021

(51) Int. Cl.
*G06F 7/00* (2006.01)
*G06F 17/00* (2019.01)
*G06F 16/23* (2019.01)
*G06F 16/2455* (2019.01)

(52) U.S. Cl.
CPC ...... *G06F 16/2379* (2019.01); *G06F 16/2308* (2019.01); *G06F 16/24552* (2019.01)

(58) Field of Classification Search
None
See application file for complete search history.

(56) References Cited

U.S. PATENT DOCUMENTS

| 5,515,531 | A | 5/1996 | Fujiwara et al. |
| 5,999,941 | A | 12/1999 | Andersen |
| 6,341,311 | B1 | 1/2002 | Smith et al. |

(Continued)

FOREIGN PATENT DOCUMENTS

| CN | 101848245 A | 9/2010 |
| CN | 102103544 A | 6/2011 |

(Continued)

OTHER PUBLICATIONS

GemStone Systems Inc. et al., Gem Fire Enterprise—Architectural Overview, Internet Citation (Jan. 1, 2006) pp. 1-72 XP-002695753.

(Continued)

*Primary Examiner* — Tuan A Pham

(57) ABSTRACT

A database proxy includes a computing device and a hardware-accelerated database proxy module. The computing device and the database proxy module. The database proxy is configured to receive a write request from a client; store the write request in a commit log in a first non-volatile memory device; in response to storing the write request in the commit log, return to the client a signal acknowledging success of the write request; store the write request in a cache in a second non-volatile memory device; cause the write request to be written in a database store; and based on a first determination that the write request is stored in the cache and on a second determination that the write request is written in the database store, remove the write request from the commit log.

14 Claims, 7 Drawing Sheets

(56) References Cited

U.S. PATENT DOCUMENTS

| | | | |
|---|---|---|---|
| 6,801,927 | B1 | 10/2004 | Smith et al. |
| 7,552,223 | B1 | 6/2009 | Ackaouy et al. |
| 7,870,120 | B2 | 1/2011 | Andreev et al. |
| 8,595,308 | B1 | 11/2013 | Kloba et al. |
| 8,949,294 | B2 | 2/2015 | Surtani et al. |
| 9,286,221 | B1 | 3/2016 | Sundararajan et al. |
| 10,061,852 | B1 | 8/2018 | Plenderleith |
| 2002/0023114 | A1 | 2/2002 | Ito |
| 2004/0054777 | A1 | 3/2004 | Ackaouy et al. |
| 2005/0102427 | A1 | 5/2005 | Yokota et al. |
| 2008/0228521 | A1 | 9/2008 | Wilmering et al. |
| 2009/0094371 | A1 | 4/2009 | Ly et al. |
| 2009/0172142 | A1* | 7/2009 | Hanai .................. G06F 15/16 709/223 |
| 2010/0174939 | A1 | 7/2010 | Vexler |
| 2010/0180284 | A1 | 7/2010 | Ross |
| 2011/0131341 | A1 | 6/2011 | Yoo et al. |
| 2011/0320019 | A1 | 12/2011 | Lanciani et al. |
| 2012/0016931 | A1 | 1/2012 | Singh et al. |
| 2012/0102134 | A1 | 4/2012 | Burckart et al. |
| 2013/0019000 | A1* | 1/2013 | Markus .................. G06F 9/466 709/223 |
| 2013/0218840 | A1* | 8/2013 | Smith ................ G06F 16/2358 707/639 |
| 2013/0219472 | A1 | 8/2013 | Hsu |
| 2015/0264151 | A1 | 9/2015 | Singh et al. |
| 2015/0341466 | A1 | 11/2015 | Sah et al. |
| 2016/0119903 | A1 | 4/2016 | Skog |
| 2016/0147813 | A1* | 5/2016 | Lee ...................... G06F 16/128 707/703 |
| 2017/0147310 | A1* | 5/2017 | Bregler .................. G06F 16/21 |
| 2017/0195449 | A1 | 7/2017 | Mobbs et al. |
| 2017/0295236 | A1 | 10/2017 | Kulkarni et al. |
| 2017/0374151 | A1 | 12/2017 | Moorthi et al. |
| 2018/0075086 | A1 | 3/2018 | Yam et al. |
| 2018/0246911 | A1* | 8/2018 | Lee ........................ G06F 16/21 |
| 2019/0273782 | A1 | 9/2019 | Kulkarni et al. |
| 2019/0374916 | A1 | 12/2019 | Sherman et al. |
| 2020/0053181 | A1 | 2/2020 | Long, III et al. |
| 2020/0059515 | A1 | 2/2020 | Kulkarni et al. |

FOREIGN PATENT DOCUMENTS

| | | |
|---|---|---|
| CN | 102262680 A | 11/2011 |
| CN | 102594798 A | 7/2012 |
| CN | 103209121 A | 7/2013 |
| CN | 104219085 A | 12/2014 |
| CN | 104750558 A | 7/2015 |
| CN | 105122241 A | 12/2015 |
| WO | WO-2017176533 A1 | 10/2017 |

OTHER PUBLICATIONS

Hazelcast, Inc., Hazelcast Documentation, version 3.6-RC1, Jan. 10, 2016, pp. 1-392, XP-055370017.
Joseph Ruzzi, Oracle Coherence—Getting Started Guide, Release 3.5, Jun. 1, 2009, pp. 1-176, XP-055370008.
Coodoing, "Database Design of High Concurrency System", Retrieved from https://www.cnblogs.com/ttltry-air/archive/2012/08/13/2636884.html, Aug. 13, 2012, 12 pages.
Final Office Action received for U.S. Appl. No. 16/351,818, dated Feb. 6, 2020, 13 pages.
Final Office Action received for U.S. Appl. No. 16/351,818, dated Nov. 27, 2020, 15 pages.
International Search Report—PCT/US2017/024840—ISA/EPO—dated May 19, 2017 (70634 2WO01).
Molitor, Kerri, "Caching Options for Optimizing Your VPS", Retrieved from https://www.liquidweb.com/blog/caching-options-for-optimizing-your-vps/, on Aug. 4, 2021, Aug. 14, 2015, 5 pages.
Non-Final Office Action received for U.S. Appl. No. 16/351,818, dated May 15, 2020, 14 pages.
Notice of Allowance received for U.S. Appl. No. 16/351,818 dated Feb. 10, 2021, 8 pages.
Written Opinion—PCT/US2017/028480—ISA/EPO—dated May 19, 2017 (70634 2WO01).
Zhiewei, Xiao, "China Excellent Master's Thesis Full-text Database Information Technology Series", Design of Hierarchical MapReduce Model for Multi-core Cluster and Realization, Mar. 15, 2013, 59 pages.

* cited by examiner

PERSISTENCE OF WRITE REQUESTS IN A DATABASE PROXY

BACKGROUND

Field of the Various Embodiments

The present disclosure relates generally to computing systems and, more specifically, to persistence of write requests in database proxy technology between an application server and a database server/store.

Description of the Related Art

Data center architecture has been evolving rapidly over the last decade. This includes changes to the data center architecture for systems including one or more data servers (also referred to as data stores). One change resulting from this evolution is the use of a database proxy between an application server and a database server/store. Database proxy technology has enabled improved throughput and lower latency for read operations between the application server and the database server/store.

A drawback of current database proxy techniques is the handling of write requests. Under current database proxy techniques, a write request is acknowledged to the client as successful when the write request is acknowledged as successful by the database store. This acknowledgement wait can delay operations at the client, which may need knowledge of success of the write requests to progress to subsequent operations. Another drawback is that, if the acknowledgement of success at the database store is unavailable, the write request is not accounted for from the perspective of the client. Thus, the client has no guarantee that the write request is successful, and the integrity of the data in the database store is not guaranteed.

Accordingly, improved database proxy techniques for handling write requests are desirable.

SUMMARY

According to some embodiments, a method of processing database write requests using a database proxy includes receiving a database write request from a client via a network interface of a computing device; storing the database write request in a commit log in a first non-volatile memory device coupled to the computing device; in response to storing the database write request in the commit log, returning to the client a signal acknowledging success of the database write request; storing the database write request in a cache in a second non-volatile memory device coupled to a database proxy module located in a field programmable gate array; causing the database write request to be written in a database store; and based on a first determination that the database write request is stored in the cache and on a second determination that the database write request is written in the database store, removing the database write request from the commit log.

According to some embodiments, a database proxy includes a computing device and a hardware-accelerated database proxy module. The computing device includes one or more processors, memory, and a network interface coupling the database proxy to one or more networks. The hardware-accelerated database proxy module is located in a field programmable gate array. The database proxy is configured to receive a database write request from a client via the network interface; store the database write request in a commit log in a first non-volatile memory device accessible to the computing device; in response to storing the database write request in the commit log, return to the client a signal acknowledging success of the database write request; store the database write request in a cache in a second non-volatile memory device accessible to the database proxy module; cause the database write request to be written in a database store; and based on a first determination that the database write request is stored in the cache and on a second determination that the database write request is written in the database store, remove the database write request from the commit log.

An advantage and technological improvement of the disclosed techniques is that a write request may be acknowledged as successful to a client sooner, while still guaranteeing writing of data as requested by the write request.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
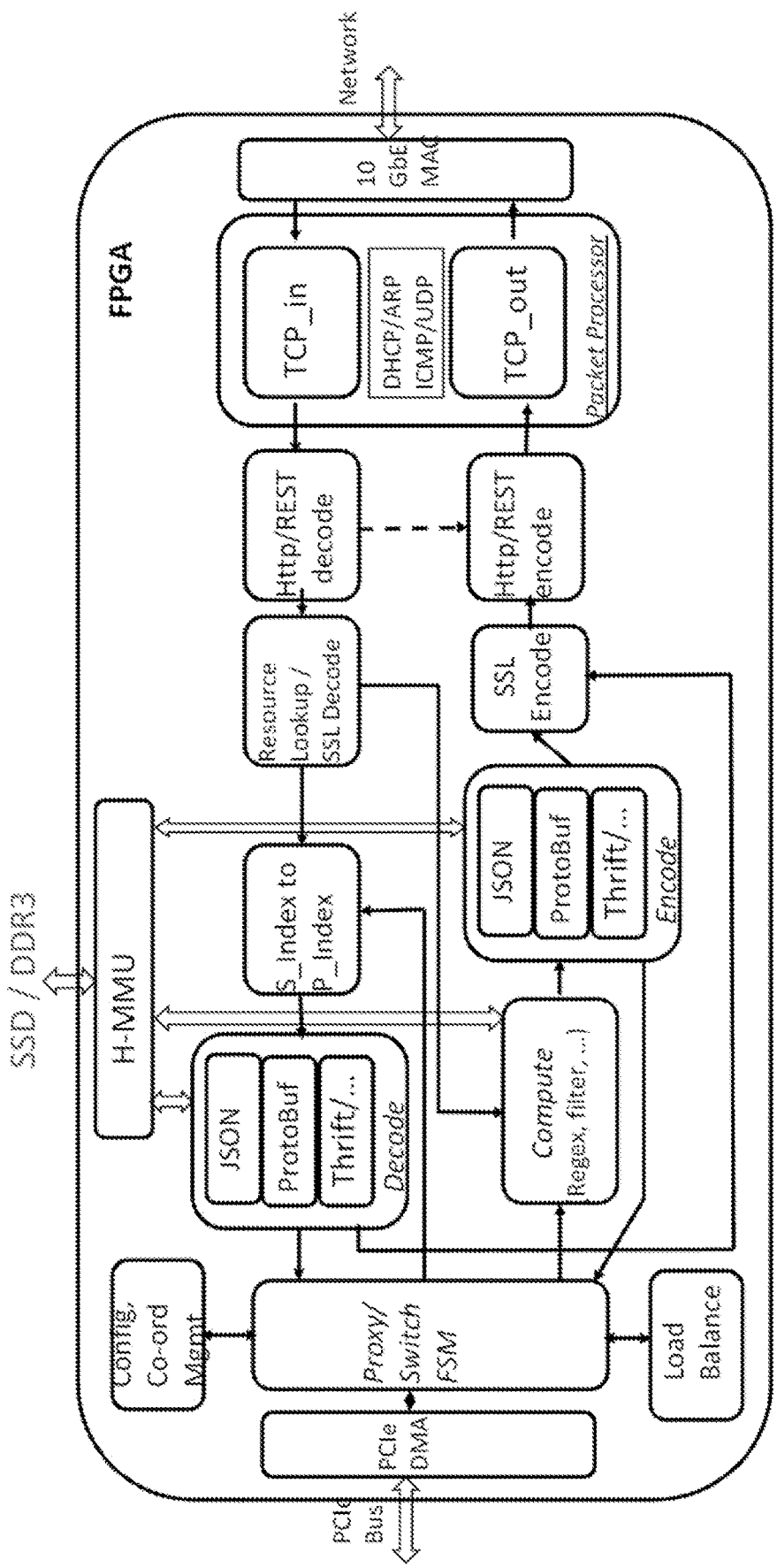
FIG. 1 is a simplified diagram of an internal architecture for a database proxy according to various embodiments.

FIG. 1 is a simplified diagram of an internal architecture for a database proxy according to various embodiments. The database proxy may be implemented using any suitable combination of one or more central processing units, processors, multi-core processors, microprocessors, field programmable gate arrays (FPGAs), application specific integrated circuits (ASICs), systems on a chip (SOCs), off the shelf components, boards, and/or the like; including, for example, a combination of one or more central processing units and FPGAs, a combination of one or more FPGAs and SOCs, and/or the like. As shown in FIG. 1, the database proxy includes the following subsystems:

the IO sub-system includes a 10 GbE MAC, a hybrid memory controller interfacing with DDR3 DRAM memory and SSD Flash memory, and a PCIe 3.0 interface. In some examples, this sub-system is implemented in Verilog. Depending upon whether the database proxy is located in an application server or a data store, data commands to be processed by the database proxy may be received via the PCIe interface and/or the network via the 10 GbE MAC.

the packet processor manages Ethernet and TCP/IP connections with, for example, a Linux server. In some examples, the packet processor may be implemented in C and is operable with a standard Linux distribution, such as CentOS as well as on FPGA. The packet processor supports IPv4, TCP, DHCP, ARP, ICMP protocols. A suitable packet processor is described further in U.S. Patent Application Ser. No. 62/681,922, titled "Bid Gateway for a Real-time Ad Bidding" and filed in January 2016, which is hereby incorporated by reference in its entirety.

a secure REST interface includes a HTTP engine and an SSL engine. In some examples, in this sub-system, a REST interface encoder and decoder are implemented based on a HTTP engine. In some examples, the REST interface supports SSL encoding and decoding for secure data exchange.

a data serdes engine supports various serdes protocols (e.g., JSON, ProtoBuf, Thrift, etc.). The data serdes engine allows for instantiating various serdes protocols with an ability to do protocol translation at line-rate. For example, the incoming data requests can be in JSON, whereas the data store returns data in BSON or Thrift. The data serdes engine will perform data format translation and return back valid JSON data to the application logic.

an index converter provides support for line rate translation of secondary indices included as part of data request to primary indices. This allows the data request to be completed using the more efficient primary indices.

a Proxy finite state machine (FSM) that comprises a FSM to manage various data and control transactions. The Proxy FSM keeps track of the state information of the database proxy on a per-transaction basis and/or on a per-connection basis. It also interfaces with the configuration and coordination engine as well as the load balancer to determine appropriate actions (e.g., forwarding requests to another peer database proxy).

a configuration and coordination engine that manages consensus and coordination among the sub-systems and/or other peer database proxies operating in cooperation with the current database proxy. Usually there is a trade-off between accepting data loss or delay or inconsistency and devoting more CPU cycles and network bandwidth to this function. One of the blocks in the configuration and coordination engine that can be accelerated and made highly efficient is the atomic broadcast (at the leader side) and the register and response block (at the follower side). In some examples, these improvements are implemented in the configuration and coordination engine so that scaling to more database proxies becomes efficient. In some examples, the configuration and coordination engine operates using the Apache ZooKeeper project. In some examples, Zookeeper is used for consensus and coordination of status and functional upkeep information (e.g., service is at w.x.y.z IP address, supports xxx Mb/s traffic, service is up, etc.). In some examples, Zookeeper is not for general data sharing between database proxies, which occurs over the network interface.

a load balancer to interface with other peer database proxy instances to better manage the application side traffic. In some examples, the load balancer maintains a set of counters and logic to measure a targeted metric (e.g., transactions per second, Mb/s or Gb/s, and/or the like) and decides whether a particular peer database proxy is running at a load higher than a present number (e.g., 85%, 90%, and/or the like). In some examples, when it appears based on the targeted metric that a database proxy is likely not going to be able to meet the set system-level agreement (SLA), an incoming request for a transaction is forwarded to another peer database proxy that has more capacity to handle the request. In some examples, bloom filters and/or the like are used to determine as a pre-processing step to load balancing whether the data for the incoming request being analyzed is cached in the current database proxy. When the data is not cached locally, the request becomes subject to load balancing and may be forwarded to a peer database proxy that has capacity to do further calculations and handle the request.

a hybrid memory management unit (H-MMU) that allows a flexible caching strategy where data may be stored using a combination of DRAM and SSD. In some examples, this allows access to cached data at DRAM latencies while allowing the H-MMU to determine appropriate reading and/or writing schedules to the SSD. In some examples, the H-MMU may also enable isolation of either DRAM or SRAM from SSD, so that data may be cached directly in SSD without also being cached in SRAM or DRAM. In some examples, this isolation supports the writing of temporary data to SRAM and not allowing other permanent data from polluting the SRAM that is crucial to achieving performance. In some examples, the bloom filter tables/vectors may be stored in the SRAM and perform fast checks on whether the said proxy has the specific data or not. Architecture and operation of embodiments of the H-MMU is further described in U.S. Pat. No. 9,286,221, which is hereby incorporated by reference in its entirety.

a compute block that supports regular expression (regex) evaluation, filtering, and/or the like. In some examples, the compute block supports libraries capable of extending a language framework such as node.js. In some examples, the compute block supports tight coupling with one or more processors on the FPGA and/or accessible to the database proxy via the PCIe interface, and/or other interfaces. In some examples, an interface, such as QuickPath Interconnect (QPI) from Intel Corporation, accelerator coherence port (ACP) from ARM Ltd., Coherent Accelerator Processor Interface (CAPI) from IBM, and/or the like, allows data moves between the database proxy and the one or more processors using L2/L3 cache and not via the PCIe bus. In some examples, a compilation of a domain-specific language, such as Ragel and/or the like, may be used to support descriptions of complex data filtering and classing using regular expressions, that will generate C code for operation on the one or more processors or that can alternative be compiled into an FPGA using a high-level synthesis compiler.

According to some embodiments, the database proxy may receive a data command from application logic via the PCIe interface when the database proxy is located in the application server or via the 10 GbE MAC network interface from either an application server (e.g., when the database proxy is located in either the application server or the data store) or from a peer database proxy when the database proxy has cached data for a command received by the peer database proxy. In some examples, the command is then forwarded to the index converter so that data references in the command that each reference to a secondary index is converted to a corresponding primary index to make the ensuing data access requests more efficient. In some examples, the index conversion occurs as line rate so as not to introduce unwanted delays in the processing of the command. In some examples, the command is then passed to the data serdes engine to convert data in the command to the data format protocol of the data store. In some examples, the protocol conversion occurs as line rate so as not to introduce unwanted delays in the processing of the command. The command is then processed (e.g., based on the type of command (e.g., CREATE, READ, UPDATE, and/or DELETE) and where the data associated with the command is located). In some examples, the results of the command are then passed through a compute block for additional processing to support additional expression evaluation and/or filtering. In some examples, results of the command are then passed back through a data serdes engine to convert the results to the data format protocol of the application logic issuing the command. In some examples, the protocol conversion occurs as line rate so as not to introduce unwanted delays in the processing of the command. The results of the command are then passed back to the application logic.

Figure 2:
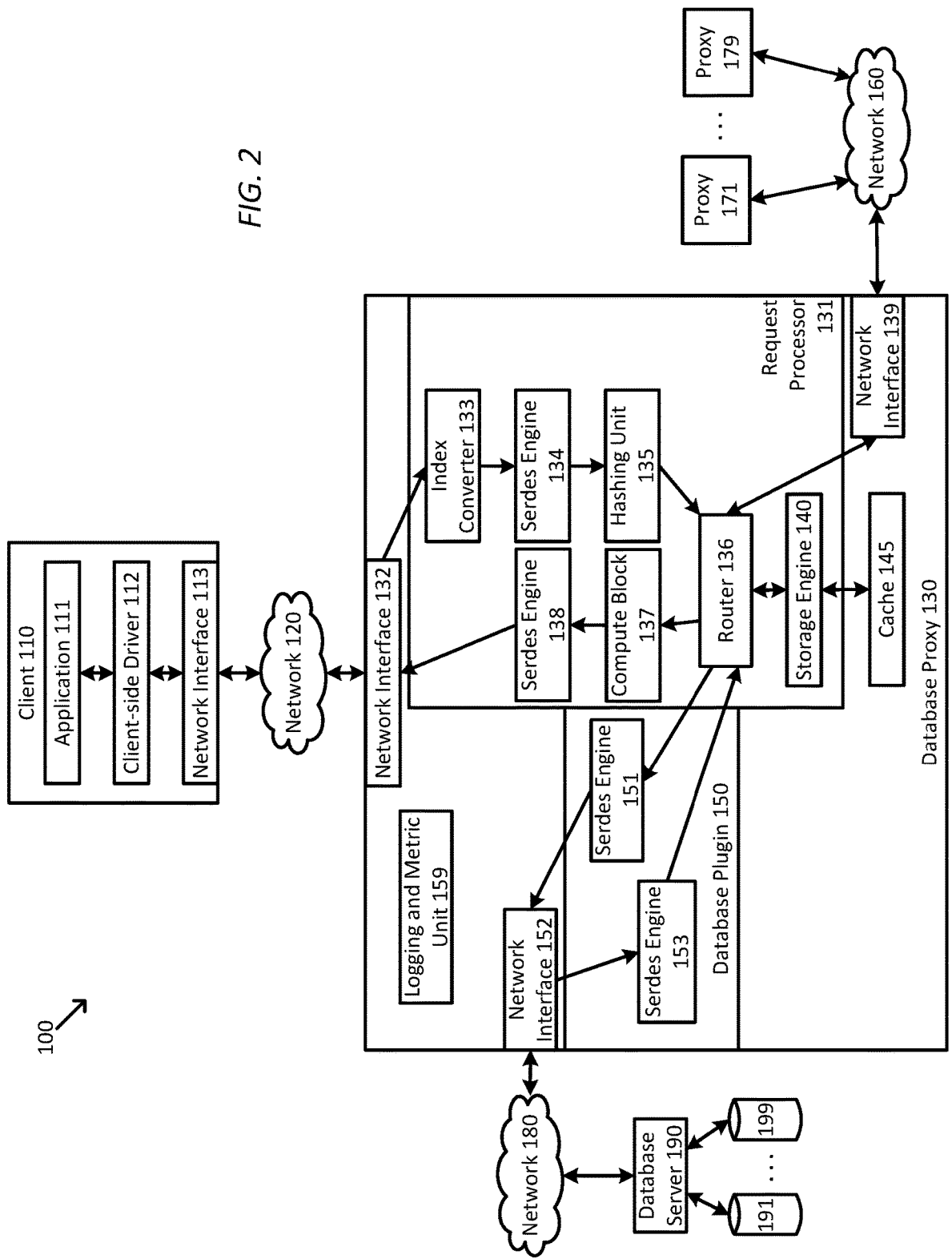
FIG. 2 is a simplified diagram of a data center architecture using database proxies according to various embodiments.

FIG. 2 is a simplified diagram of a data center architecture 100 using database proxies according to various embodiments. As shown in FIG. 2, data center architecture 100 is built around a multi-tier client-service model. Data center architecture 100 includes a client 110. And although only one client is shown in FIG. 2, data center architecture 100 may include any number of clients similar and/or different from client 110. In some embodiments, client 110 is consistent with the application server. And although not shown in FIG. 2, client 110 may include one or more processors, memory, operating systems, virtual machines, and/or the like as would be understood by one of ordinary skill. As shown, client 110 includes an application 111, a client-side driver 112, and a network interface 113. Application 111 is representative of any of many possible applications that may need the storage services of a database and may correspond to an end-user application, an application in an application tier supporting a front end server, and/or the like.

Application 111 uses client-side driver 112 to take advantage of the database proxies in data center architecture 100. In some examples, client-side driver 112 may include an API that acts as an interface, such as a facade interface, between application 111 and the database proxies of data center architecture 100. In some examples, client-side driver 112 may provide access to functions typically found in database driver interfaces including support for functions such as query manipulation, connection management, authentication, query submission, query results handling, transactions, and/or the like. In some examples, the functionality of the client-side driver may be implemented as a REST API and/or a native API. In some examples, client-side driver 112 may be used in place of or as a supplement to one or more other database drivers usable by application 111 to access one or more database servers in data center architecture 100. In some examples, client-side driver 112 may also provide support for connection pooling between client 110 and the database proxies of data center architecture 100 so that when a communication connection between client 110 and a database proxy is requested, an existing connection in the connection pool may be used immediately without incurring the delay of establishing a new connection.

Network interface 113 provides connectivity between client 110 and/or client-side driver 112 and a network 120. Network 120 may correspond to any type of network including a local area network (such as an Ethernet), a wireless network, a data center network, a wide area network (such as the internet), and/or the like. Network 120 may include any number of network switching devices, bridges, hubs, routers, access points, gateways, and/or the like. Network interface 113 may include a combination of software drivers, firmware, hardware modules, and/or the like that provide network access and network services as would be expected in a network driver providing support for layered network systems such as TCP/IP, OSI, and/or the like. In some examples, network interface 113 may include physical layer support, medium access control (e.g., Ethernet, and/or the like), access to routing services (e.g., IP), access to delivery services (e.g., TCP, UDP, and/or the like), support for network management (e.g., ICMP, ARP, DHCP, and/or the like), one or more packet processors, one or more queues, one or more application layer APIs (e.g., HTTP, other REST APIs, and/or the like), security (e.g., IPSec, SSL, and/or the like), and/or the like.

Data center architecture 100 further includes a database proxy 130. In some embodiments, database proxy 130 is consistent with the database proxy of FIG. 1. In some embodiments, database proxy 130 is a NoSQL database proxy. As shown in FIG. 2, database proxy 130 includes several modules that may each individually and/or collectively be implemented using any suitable combination of hardware and/or software. In some embodiments, the components of database proxy 130 (as discussed in further detail below) may be implemented using any suitable combination of one or more central processing units, processors, multi-core processors, microprocessors, FPGAs, ASICs, SOCs, off the shelf components, boards, and/or the like; including, for example, a combination of one or more central processing units and FPGAs, a combination of one or more FPGAs and SOCs, and/or the like. As would be understood by one of ordinary skill, the one or more processors, multicore processors, microprocessors, and/or the like may be executing software stored in non-transitory machine-readable media (not shown). Some common forms of machine readable media that may include the processes and methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Database proxy 130 includes a request processor 131, a cache 145, a database plugin 150, a logging and metric unit 159, and several network interfaces 132, 139, and 152. Request processor 131 is responsible for the processing of database requests received through network interface 132 and/or network interface 139. Request processor 131 is further responsible for sending database requests to database plugin 150 when the database request involves underlying database action and for sending database requests to other database proxies when those other database proxies are responsible for processing one or more portions of the database request. Request processor 131 further uses cache 145 for local and/or other cache storage. In some examples, cache 145 may be a persistent cache that stores data in non-volatile storage such as Flash/SSD.

Similar to network interface 113, network interface 132 may include a combination of software drivers, firmware, hardware modules, and/or the like that provide network access and network services as would be expected in a network driver provide support for layered network systems such as TCP/IP, OSI, and/or the like. In some examples, network interface 132 may include physical layer support, medium access control (e.g., Ethernet, and/or the like), access to routing services (e.g., IP), access to delivery services (e.g., TCP, UDP, and/or the like), support for network management (e.g., ICMP, ARP, DHCP, and/or the like), one or more packet processors, one or more queues, one or more application layer APIs (e.g., HTTP, other REST APIs, and/or the like), security (e.g., IPSec, SSL, and/or the like), and/or the like. Network interface 132 receives database requests from application 111 via client-side driver 112 and network 120. As each of the database requests is received, it is assigned a request identifier by request processor 131 to aid in tracking the database requests as they are processed by database proxy 130. In some examples, the identifier may correspond to a session identifier, connection identifier, and/or the like.

Request processor 131 includes an index converter 133. As database requests are received from client 110 via client-side driver 112 and network 120, the database requests are forwarded by network interface 132 to index converter 133. Index converter 133 provides support for translation of secondary indices included as part of each of the database requests to primary indices that are used to organize and store the database records cached by request processor 131. In some examples, the index converter 133 may operate at line rate so that the index conversion of the database read request does not slow down the pipeline of database requests being handled by request processor 131. In some examples, index converter 133 may use one or more lookup and/or cross-reference structures, such as one or more tables, to convert the database requests that reference data using one or more of the secondary indices to database requests that rely on the primary indices. For example, when a database request specifies a subset of data (e.g., via a "WHERE" clause or similar) using columns or fields that correspond to one of the secondary indices, index converter 133 modifies the database request to use the primary indices. In some examples, this index conversion allows for the data request to be completed using the more efficient primary indices. When a database request specifies data using just primary keys, the database request is passed through index converter 133 without change.

After being processed by index converter 133, the database requests are forwarded to a serdes engine 134. In some examples, serdes engine 134 may support various serdes protocols (e.g., JSON, ProtoBuf, Thrift, and/or the like). In some examples, the serdes engine 134 may operate at line rate so that the data protocol conversion of the database read request does not slow down the pipeline of database requests being handled by request processor 131. In some examples, serdes engine 134 is used to support conversion between the data formatting protocols used by application 111 to the data formatting protocols used by request processor 131. This allows the other modules of request processor 131 to operate natively in their preferred data formatting protocol without having to perform separate conversion of the data formatting protocols of application 111. For example, when a database request includes data in the JSON format and request processor 131 works natively in the BSON format, serdes engine 134 converts the JSON formatted data objects to BSON formatted data objects. When a database request includes data already in the native format of request processor 131, the database request is passed through serdes engine 134 without change.

After being processed by index converter 133 and/or serdes engine 134, the database requests are forwarded to a hashing unit 135. Hashing unit 135 examines the primary index, range of primary indices, and/or set of primary indices included in a database request and applies a hashing function to each index to determine a fixed-length hash value for each index. In some examples, the hashing function may be any suitable hashing function, such as a cyclic redundancy check, a checksum, a universal hash, a non-crytographic hash, and/or the like. In some examples, the structure of the hashing function and how it hashes each of the indices is based on how request processor 131 organizes and/or retrieves data. In some examples, when request processor 131 organizes and/or retrieves data consistent with a columnar data format, such as the columnar data format of Apache Cassandra, the hashing function may be applied to a key space, a table identifier, and/or a key or primary index value from the database request. When the database request includes a range of primary indices and/or a group of primary indices, the hashing function may be applied multiple times to different index values to determine a series of hash values corresponding to the database request. In some examples, other database formats may be used with different hashing functions. The one or more hash values are then forwarded to a router 136 for further processing.

In some embodiments, router 136 corresponds to the proxy finite state machine, configuration and coordination engine, and/or the load balancer of FIG. 1. Router 136 determines the one or more locations where the data requested and/or identified by each database request is stored based on the one or more hash values provided by hashing unit 135 for the database request. Router 136 examines each of the hash values to determine whether the hash value falls within a range of hash values that are the responsibility of database proxy 130 or one of the other database proxies 171-179 forming a proxy cluster with database proxy 130. In some examples, the set of possible hash values are divided into a plurality of hash value ranges with each of database proxy 130 and database proxies 171-179 being responsible for one or more of the hash value ranges. In some examples, the hash values may be mapped according to a consistent hashing and/or similar arrangement where the set of possible hash values are mapped to a circular space with each of database proxy 130 and database proxies 171-179 being assigned to one or more angular ranges within the circular space. In some examples, the division of hash values among database proxy 130 and the one or more other database proxies 171-179 supports load balancing among database proxy 130 and the one or more other database proxies 171-179.

Router 136 then makes a determination, for each hash value, whether further processing of data associated with that hash value is to be performed by database proxy 130 or one of the other database proxies 171-179. When the hash value corresponds to one of the ranges of hash values assigned to database proxy 130, database proxy 130 accesses the data associated with the hash value. When the hash value corresponds to one of the ranges of hash values associated with a hash value of one or the other database proxies 171-179, the processing of the data associated with the hash value is forwarded to a corresponding one of the other database proxies 171-179 that is assigned the hash value. The database request with the hash value is forwarded to the corresponding one of the other database proxies 171-179 using network interface 139. When the corresponding one of the other database proxies 171-179 finishes processing of the forwarded database request, the other database proxy 171-179 returns results and/or a response to router 136 through network interface 139.

Network interface 139 is similar to network interfaces 113 and/or 132 and provides interconnectivity with each of the other database proxies 171-179 via a network 160 that is similar to network 120. In some examples, each of the other database proxies 171-179 may be substantially similar to database proxy 130 and may receive the forwarded database request on a corresponding network interface 139. In some examples, network interface 139 may provide connection pooling with the corresponding network interfaces 139 in each of the other database proxies 171-179. And although FIG. 2 shows two other database proxies 171 and 179, any number of other database proxies is possible including one, three, and/or four or more.

Referring back to router 136. When router 136 determines that the hash value is assigned to database proxy 130, router 136 examines the database request to determine whether it is a read, a write, an update, or a delete request. When the database request is a read request, router 136 uses a storage engine 140 to determine whether a local copy of the associated data is stored in cache 145. In some examples, the hash value determined by hashing unit 135 may be used by storage engine 140 as an index into cache 145 and a determination is made whether the associated data is stored in cache 145 by looking up hash value in cache 145. In some examples, when the hash value is not used as an index by cache 145, storage engine 140 and/or cache 145 may compute a different hash and use that to determine whether the associated data is stored in cache 145. When the associated data is stored in cache 145, it is retrieved from cache 145 by storage engine 140 and returned to router 136 as results for the database request. In some examples, storage engine 140 and/or cache 145 may use any suitable data replacement policy, such as least-recently use, least-frequently used, and/or the like. In some embodiments, storage engine 140 includes an H-MMU, which is further described in U.S. Pat. No. 9,286,221, which is hereby incorporated by reference in its entirety. In some embodiments, storage engine 140 overlays one or more higher-order data models onto cache 145 that provide support for various NoSQL database types. In some examples, the one or more higher-order models may include columnar (such as used by Apache Cassandra), graph, document store, and/or other suitable data formats.

When the database request is a write request (e.g., UPDATE, INSERT, DELETE), the hash value (or other index used by storage engine 140 and/or cache 145) is used to store the results in cache 145 and then a copy is written to an underlying database using a database plugin 150. When the database request is a delete request, the hash value (or other index used by storage engine 140 and/or cache 145) is used to delete the corresponding data from cache 145 if a copy is stored in cache 145 and database plugin 150 is used to delete the corresponding data from the underlying database. When the database request is an update request, the hash value (or other index used by storage engine 140 and/or cache 145) is used to update the corresponding data in cache 145 if the corresponding data is already stored in cache 145 or to store the corresponding data in cache 145 if the corresponding data in not already stored in cache 145. A copy is then written to the underlying database using database plugin 150. In some examples, a write, update, and/or a delete request is forwarded to the underlying database by database plugin 150 consistent with the writing policy of the underlying database, whether that is a write-back and/or a write-through policy.

When a database request is associated with multiple hash values, router 136 subdivides the database request into a series of database sub-requests corresponding to each of the hash values. Each of the sub-requests and associated hash values is then processed separately by router 136 using storage engine 140, cache 145, database plugin 150, and/or one of the other database proxies 171-179. Router 136 then collects the sub-results and/or sub-responses associated with each of the hash values into composite results and/or a composite response. In some examples, tracking of the various sub-requests and sub-results may be managed by tagging each of the sub-requests and sub-results with the request identifier assigned to the originating database request when it was received by request processor 131.

After the results and/or response to the database query is assembled by router 136, the results and/or response are forwarded to a compute block 137. Compute block 137 provides support for regular expression evaluation, filtering, and/or the like that may be included as part of the database request. In some examples, compute block 137 may provide support for compression, encryption, and/or similar functions. In some examples, compute block 137 supports libraries capable of extending a language framework such as node.js, via support of stored procedures, and/or the like. In some examples, compute block 137 may be implemented via a compilation of a domain-specific language, such as Ragel and/or the like, which may be used to support descriptions of complex data filtering and classing using regular expressions, that will generate C code for operation on the one or more processors or that can alternatively be compiled into an FPGA using a high-level synthesis compiler. When the results and/or response are not subject to expression, filtering, and/or the like as part of the database request, the results and/or response are passed through compute block 137 without change.

The results and/or response are then forwarded to a serdes engine 138 in further preparation for returning the results and/or response to requesting application 111. In some examples, serdes engine 138 is similar to serdes engine 134 and is responsible for converting data objects from the data formatting protocol used by request processor 131 to the data formatting protocol used by application 111. When application 111 and request processor 131 use the same data formatting protocols and/or the results and/or response do not include any data objects, the results and/or response are passed through serdes engine 138 without change.

After processing by serdes engine 138, the results and/or response are passed back to application 111 by network interface 132. In some examples, correct delivery of the results and/or response to application 111 is managed using the request identifier assigned to the originating database request when it was received by database proxy 130.

Database plugin 150 is selected from a series of possible database plugins depending upon the type of the underlying database as each underlying database typically uses different query languages, data formatting protocols, writing policies (write-back and/or write-through), transaction policies, underlying architectures, and/or the like. In some examples, the types of underlying database supported by database plugin 150 may include Apache Cassandra, Mongo, Hbase, Hadoop, and/or the like. Database plugin 150 includes a serdes engine 151 that is similar to serdes engine 134 and/or serdes engine 138. Serdes engine 151 is responsible for converting data objects from the data formatting protocol used by database proxy 130 to the data formatting protocol used by the underlying database. When the underlying database and request processor 131 use the same data formatting protocols and/or the database request does not include any data objects, the database request is passed through serdes engine 151 without change.

After processing by serdes engine 151, the database request is forwarded to network interface 152 for delivery to a database server 190 for the underlying database. Database server 190 provides access to one or more databases 191-199 that form the underlying database. Network interface 152 is similar to network interfaces 113, 132, and/or 139 and provides interconnectivity with database server 190 via a network 180 that is similar to network 120 and/or 160. In some examples, network interface 152 and database plugin 150 may access database server 190 using one or more APIs of database server 190. In some examples, network interface 152 may provide connection pooling with a network interface (not shown) in database server 190. And although FIG. 2 shows a single database server, database plugin 150 is capable of communicating with two or more database servers.

After database server 190 returns a response to the database request (either as results of a read or status of a write, update, or delete) to database plugin 150 via network interface 152, the results and/or response are forwarded to a serdes engine 153 that is similar to serdes engine 134, 138, and/or 151. Serdes engine 153 is responsible for converting data objects from the data formatting protocol used by the underlying database to the data formatting protocol used by database proxy 130. When the underlying database and database proxy 130 use the same data formatting protocols and/or the results and/or response do not include any data objects, the results and/or response are passed through serdes engine 153 without change.

After processing by database plugin 150, the results and/or response are returned to router 136 where they may be combined with other results and/or responses for return to application 111 as described above. When the results are in response to a database read request, the results may be stored in cache 145 as previously discussed.

Logging and metric unit 159 provides logging and analytics support for database proxy 130. In some examples, logging and metric unit 159 provides one or more logs supporting by one or logging APIs that the other units of database proxy 130 (e.g., request processor 131, network interface 132, index converter 133, serdes engine 134, hashing unit 135, router 136, compute block 137, serdes engine 138, network interface 139, storage engine 140, cache 145, serdes engine 151, network interface 152, and/or serdes engine 153) may use to log their respective activities as they handle database requests. In some examples, the one or more logs may be used to track database requests, debug the processing of requests, and/or the like. In some examples, the one or more logs may be accessed by clients (such as client 110 and/or application 111) and/or administrators to monitor the activities of database proxy 130. In some examples, logging and metric unit 159 may provide one or more analytics engines that may determine one or more performance metrics (e.g., throughput, latency, utilization, cache capacity, hit rates, and/or the like) and/or one or more operational statistics. In some examples, the one or more performance metrics and/or the one or more operational statistics may be accessed by clients (such as client 110 and/or application 111) and/or administrators via one or more APIs. In some examples, one or more of the entries in the one or more logs, the one or more performance metrics, and/or the one or more operational statistics may be accessed and/or shared using network interface 132.

As discussed above and further emphasized here, FIG. 2 is merely an example which should not unduly limit the scope of the claims. One of ordinary skill in the art would recognize many variations, alternatives, and modifications. In some embodiments, database proxy 130 may further include more than one database plugin to support the forwarding of database requests to multiple database servers, to support database servers of different types, and/or the like.

In some embodiments, different interconnections are possible between client 110, database proxy 130, the other database proxies 171-179, and/or database server 190. In some examples, any two or more of network interface 132, network interface 139, and/or network interface 152 may be combined so that the same hardware and/or software modules may be usable by database proxy 130 to communicate with client 110, the other database proxies 171-179, and/or database server 190. In some examples, the decision whether to use separate or combined network interfaces may be based on balancing between the extra throughput of parallelism versus fewer circuits and/or modules within database proxy 130. In some examples, whether to use separate or combined network interfaces may depend on the number of network ports, buffer sizes, and/or the like supported by network interfaces 132, 139, and/or 152. Similarly, any two or more of network 120, 160, and/or 180 may be a same network.

In some embodiments, one or more of the interconnections between database proxy 130 and client 110, the other database proxies 171-179, and/or database server 190 may be implemented using local port connections, buses, and/or the like rather than network connections. In some examples, when database proxy 130 is installed in client 110, database proxy 130 may be interconnected to the rest of client 110 using one or more ports, one or more buses, and/or the like. In some examples, database proxy 130 and/or one or more of the other database proxies 171-179 may be optionally mounted in a same chassis allowing interconnect between database proxy 130 and the one or more of the other database proxies 171-179 through a mid-plane and/or backplane connection mechanism. In some examples, when database proxy 130 is installed in database server 190, database proxy 130 may be interconnected to the rest of database server 190 using one or more ports, one or more buses, and/or the like. In some embodiments, the one or more ports and/or one or more buses may be PCIe buses, QuickPath Interconnects, accelerator coherence ports, advanced microcontroller bus architecture (AMBA) buses, and/or the like.

Figure 3:
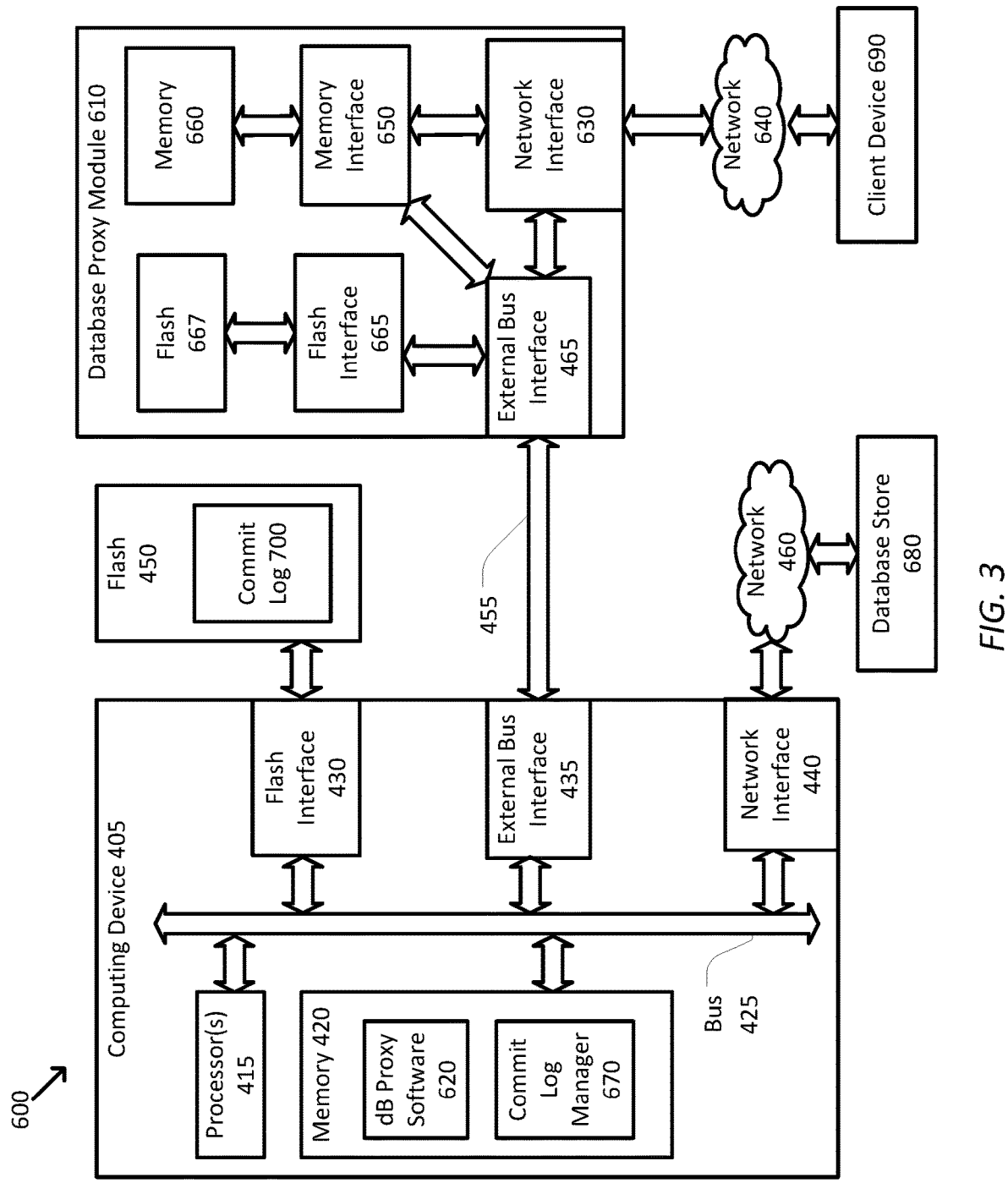
FIG. 3 is a simplified diagram of a configuration for a database proxy according to various embodiments.

As discussed above with respect to FIG. 2, the data center architecture 100 includes database proxy 130, which is described in terms of the functional units used to implement database proxy 130. According to some embodiments, database proxy 130 may be implemented using any one of several possible architectures and/or configurations, such as a single-chip device, a system on a chip, a set of stacked chips, a computing device with one or more boards, a set of stacked boards, and/or the like. FIG. 3 is a simplified diagram of a non-limiting example of a configuration for a database proxy according to various embodiments.

As shown in FIG. 3, a database proxy 600 includes a computing device 405 and a database proxy module 610 shown as separate units. In some examples, database proxy module 610 provides hardware acceleration to one or more of the functions of database proxy 600. In some examples, computing device 405 and database proxy module 610 may be implemented as a system on a chip (such as a FPGA with an embedded processor), separate chips on a chip stack, separate boards in a computing device (e.g., as a set of stacked boards, boards in a card cage, and/or the like), and/or the like. In some examples, database proxy 600 is consistent with the database proxy of FIG. 1 and/or database proxy 130.

As further shown in FIG. 3, computing device 405 includes one or more processors 415, memory 420, an internal bus 425, an optional flash memory interface 430, an external bus interface 435, and a network interface 440. The one or more processors 415 are coupled to internal bus 425 so as to be able to communicate and interface with memory 420, flash memory interface 430, external bus interface 435, and/or network interface 440. Each of the one or more processors 415 may be consistent with a central processing unit, a core in a multi-core processor, a multi-core processor, a microprocessor, a microcontroller, a digital signal processor, a graphics processing unit (GPU), a tensor processing unit (TPU), and/or the like.

Memory 420 may be used to store software executed by the one or more processors 415 and/or one or more data structures used during operation of computing device 405 and/or database proxy 600. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 420 includes a database proxy software module 620 that is responsible for controlling one or more aspects of the operation of computing device 405 and/or database proxy 600 including, for example, an operating system and/or software to use the functionality of database proxy module 610, the functionality of flash memory interface 430, the functionality of external bus interface 435, the functionality of network interface 440, and/or the like. In some examples, database proxy software module 620 may include one or more APIs, software libraries, and/or the like to provide the desired control and/or access to the functionality of database proxy 600. As but one example, database proxy software module 620 may include a network interface stack as part of the operating system and/or separate from the operating system that may be used, in conjunction with, network interface 440 to provide general network functionality (e.g., an implementation of TCP/IP and/or the like), the network functionality of network interfaces 132, 139, and/or 152, and/or the like.

Internal bus 425 provides internal communication within computing device 405 between the one or more processors 415, memory 420, flash memory interface 430, external bus interface 435, and/or network interface 440. In some examples, internal bus 425 may include one or more control buses, address buses, data buses, and/or the like. In some examples, internal bus 425 may support any bus architecture and/or protocol commonly used in computing devices, such as an Advanced eXtensible Interface (AXI) and/or the like.

Flash memory interface 430 provides an interface to one or more optional flash memory devices 450 accessible to computing device 405 and/or database proxy 600. In some examples, the one or more flash memory devices 450 may include one or more Non-Volatile Memory express (NVMe) devices, one or more solid-state drives (SSDs), and/or the like. In some examples, the one or more flash memory devices 450 may provide cache memory, buffer memory, non-volatile memory, and/or the like for computing device 405 and/or database proxy 600. And although the one or more flash memory devices 450 are shown separate from computing device 405, the one or more flash memory devices 450 may be included on a same chip as computing device 405.

External bus interface 435 provides an interface to one or more buses 455 external to computing device 405. In some examples, the one or more buses 455 may be used by computing device 405 to communicate with database proxy module 610. In some examples, the one or more buses 455 may include any type of bus, such as an Industry Standard Architecture (ISA) bus, an Extended ISA (EISA) bus, a Peripheral Component Interface (PCI) bus, a PCI Express (PCIe) bus, and/or the like.

Network interface 440 provides an interface to one or more networks 460 usable by computing device 405 and/or database proxy 600 to communicate with other computing devices, other database proxies (e.g., database proxies 171-179), a database server (e.g., database server 190), one or more databases (e.g., databases 191-199), one or more client devices (e.g., client 110), and/or the like. In some examples, the one or more networks 460 may be consistent with networks 120, 160, and/or 180. In some examples, network interface 440 and the network interface stack of database proxy software module 620 may implement the functionality of one or more of network interfaces 132, 139, and/or 152. As shown in FIG. 3, computing device 405 and/or database proxy 600 may communicate with a database store 680 via networks 460. Database store 680 may include a database server (e.g., database server 190) and/or one or more databases (e.g., databases 191-199).

As further shown in FIG. 3, database proxy 600 includes database proxy module 610. According to some embodiments, database proxy module 610 may be implemented using a board, a SoC, an FPGA, and ASIC, and/or the like. In some examples, database proxy module 610 provides hardware acceleration to one or more of the functions of database proxy 600. As also shown, database proxy module 610 includes an external bus interface 465, a memory interface 650, and memory 660. In some examples, external bus interface 465 is similar to external bus interface 435 and provides an interface to the one or more buses 455 used for communication between computing device 405 and database proxy module 610. In some examples, database proxy module 610 further includes an internal bus (not shown) that is similar to internal bus 425. The internal bus within database proxy module 610 may provide internal communication within database proxy module 610 between external bus interface 465, memory 660, memory interface 650, a network interface 630, and/or other components (e.g., flash memory interface 665) within database proxy module 610.

In some examples, database proxy module 610 includes a request processor (not shown). The request processor may provide the main functionality of database proxy module 610. In some examples, the main functionality includes any of the functionality described with respect to FIG. 1. In some examples, the request processor is consistent with request processor 131 and includes the functionality of one or more of index converter 133, serdes engine 134, hashing unit 135, router 136, compute block 137, serdes engine 138, and/or storage engine 140.

According to some embodiments, the request processor may be configured to optionally support databases organized around indexes and indexing, databases organized around key-value abstraction, and/or both indexes and key-value abstraction. In some examples, when the request processor supports indexes and indexing, the request processor includes an index convertor consistent with index converter 133. In some examples, when the request processor supports key-value abstraction, the request processor includes a key-value engine for accessing the databases (e.g., the databases coupled to database proxy 600 through the one or more networks 460). In some examples, the key-value engine may be supported by database proxy software module 620, which implements address translation and/or the like so that only the key-value abstraction is supplied to the request processor.

Memory interface 650 provides an interface to one or more memory devices in memory 660. In some examples, memory 660 includes one or more RAM devices, such as one or more SRAMs, DRAMs, and/or the like. In some examples, memory interface 650 and memory 660 provide local and/or cache memory for the request processor. In some examples, memory interface 650 and memory 660 provide functionality similar to cache 145. In some examples, memory interface 650 may be consistent with a double data rate (DDR) interface (such as DDR, DDR2, DDR3, and/or DDR4), a H-MMU interface (e.g., as described with respect to FIG. 1), a high bandwidth memory interface, and/or the like. And although memory 660 is shown within database proxy module 610, memory 660 may be external to database proxy module 610, such as in one or more separate chips, memory boards, and/or the like. In some examples, memory interface 650 and/or memory 660 may provide cache, buffering, and/or other storage functionality for network interface 630 and/or computing device 405 and database proxy software module 620.

In some examples, database proxy module 610 includes one or more auxiliary compute modules (not shown) to provide additional computing support and/or functionality to the request processor and/or database proxy software module 620. In some examples, database proxy software module 620 may access the one more auxiliary compute modules through internal bus 425, external bus interface 435, the one or more buses 455, external bus interface 465, and (optionally) an internal bus within database proxy module 610 and/or through a request processor. In some examples, the one or more auxiliary compute modules may include computing capability to support the compute block of the request processor (e.g., compute block 137), the serdes engines of the request processor (e.g., serdes engines 134 and/or 138), serdes engines 151 and/or 153, and/or the like. In some examples, the one or more auxiliary compute modules may include functionality to support compression, decompression, encryption, security, artificial intelligence inferencing (e.g., through neural network implementation and/or emulation), and/or the like. In some examples, the artificial intelligence inferencing may be supported using one or more GPUs, TPUs, hardware AI inferencing engines (e.g., the AI acceleration units provided by Xilinx), and/or the like.

According to some embodiments, and as shown in FIG. 3, the functionality of the request processor and/or the one or more auxiliary compute modules are implemented in database proxy software module 620. In some examples, database proxy software module 620 includes one or more APIs, software libraries, and/or the like to implement the functionality of the request processor and/or the one or more auxiliary compute modules.

In some examples, in database proxy 600, database proxy module 610 supplies hardware-accelerated network functionality. In some examples, the hardware-accelerated network functionality is supplied to replace and/or supplement the network functionality provided by network interface 440 in computing device 405. In some examples, as shown in FIG. 3, the network functionality of database proxy module 610 includes a network interface 630 coupled to external bus interface 465, which is used to access a network 640. In some examples, network interface 630 may be substantially similar to network interface 440. In some examples, network 640 may be substantially similar to network 460. In some examples, network interface 630 may include some or all of the functionality of network interface 440 and the network interface stack of database proxy software module 620. In some examples, network interface 630 may implement the functionality of one or more of network interfaces 132, 139, and/or 152. In some examples, and as shown in FIG. 3, database proxy module 610 may communicate with a client device 690 via networks 640. Additionally or alternatively, in some examples, computing device 405 may communicate with client device 690 via networks 460. In some examples, client device 690 is consistent with client 110 of FIG. 2.

According to some embodiments, flash memory interface 430 of computing device 405 is moved to database proxy module 610 as a flash memory interface, and the one or more flash memory devices 450 of database proxy 600 are moved to one or more flash memory devices in database proxy module 610. In some examples, the request processor also includes the ability to use the flash memory interface within database proxy module 610 to access the one or more flash memory devices within database proxy module 610 to, for example, have access to flash-based cache storage, flash-based buffering, non-volatile storage, and/or the like. In some examples, the flash memory interface within database proxy module 610 is substantially similar to flash memory interface 430 except that it is driven by the request processor. In some examples, the one or more flash memory devices within database proxy module 610 are substantially similar to the one or more flash memory devices 450. In some examples, database proxy software module 620 further includes APIs, software libraries, and/or the like to access the one or more flash memory devices within database proxy module 610 through the request processor.

According to some embodiments, database proxy 600 may also support different configurations. In some examples, memory 660 may be external to database proxy module 610, such as in one or more separate chips, memory boards, and/or the like. In some examples, database proxy module 610 may include a flash memory interface (e.g., flash memory interface 665) and/or one or more flash memory devices (e.g., flash memory device 667) as a supplement to and/or a replacement for flash memory interface 430 and/or the one or more flash memory devices 450, respectively. Further, in some examples, the one or more flash memory devices associated with database proxy module 610 may be external to database proxy module 610, such as in one or more separate chips, memory boards, and/or the like.

And although not expressly shown in FIG. 3, the additional functional units of database proxy 130 (e.g., logging and metric unit 159, database plugin 150, serdes engines 151 and/or 153) may be optionally implemented by one or more of database proxy software module 620, a request processor, and/or one or more auxiliary compute modules.

According to some embodiments, computing device 405 and database proxy module 610 have separate flash memory devices (e.g., flash memory device 450 for computing device 405, and flash memory device 667 for database proxy module 610). Accordingly, database proxy module 610 may include a flash memory interface 665, which is similar to flash memory interface 430, to provide an interface to flash memory device(s) 667. A commit log 700 may be located in flash memory device 450, and cache 145 may be located in flash memory device 667 of database proxy module 610. According to some other embodiments, computing device 405 and database proxy module 610 may share one or more flash memory devices (e.g., flash memory device 450 is shared by computing device 405 and database proxy module 610). In these embodiments, computing device 405 and database proxy module 610 may include flash memory interface 430 and flash memory interface 665, respectively, to provide an interface to the shared flash memory device(s).

Computing device 405 and database proxy module 610 may be assigned separate spaces within the shared flash memory device(s). Commit log 700 may be located in the space assigned to computing device 405, and cache 145 may be located in the space assigned to database proxy module 610. Additionally, in some embodiments, flash memory device 667 may be external to database proxy module 610, such as in one or more separate chips, memory boards, and/or the like.

Figure 4:
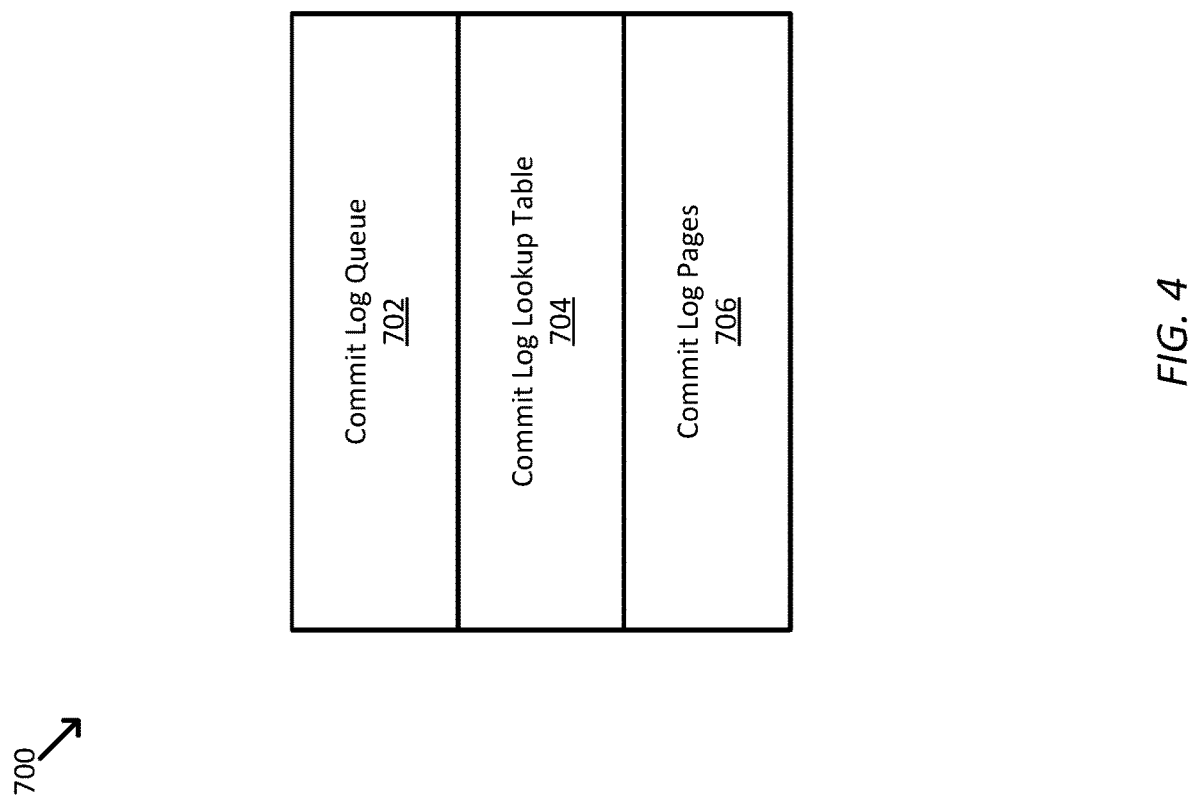
FIG. 4 is a simplified diagram of a commit log according to various embodiments.

In various embodiments, memory 420 also includes a commit log manager 670 that is responsible for controlling one or more aspects of operation of a commit log 700. Operation of commit log 700 may include, for example, storing a write request into commit log 700, removing a write request from commit log 700, and replaying write requests in commit log 700 after a failure of database proxy 600. In some examples, commit log manager 670 may include one or more APIs, software libraries, and/or the like to provide functionality associated with controlling operation of commit log 700. In some embodiments, commit log manager 670 is a module or component of database proxy software module 620. Various aspects of commit log manager 670 and commit log 700 are further described below. FIG. 4 is a simplified diagram of a commit log 700 according to various embodiments. FIG. 4 shows a commit log 700 that includes a commit log queue 702, a commit log lookup table 704, and commit log pages 706.

A write request received by database proxy 600 may be stored in commit log pages 706. An identifier (e.g., a key) of the write request may be stored in commit log queue 702. In some examples, keys of write requests are stored in commit log queue 702 in a first in, first out (FIFO) order (e.g., in the order in which the write requests are received). Commit log lookup table 704 stores mappings (e.g., hash tables) of keys to locations in commit log pages 706 where corresponding write requests are stored. In some embodiments, commit log 700 may include a sequential log of locations of write requests in commit log pages 706 and associated keys. Further, in some embodiments, memory locations of pointers to the head and the tail of commit log queue 702 may be stored persistently elsewhere in flash memory device 450 and/or in memory 420.

Figure 5:
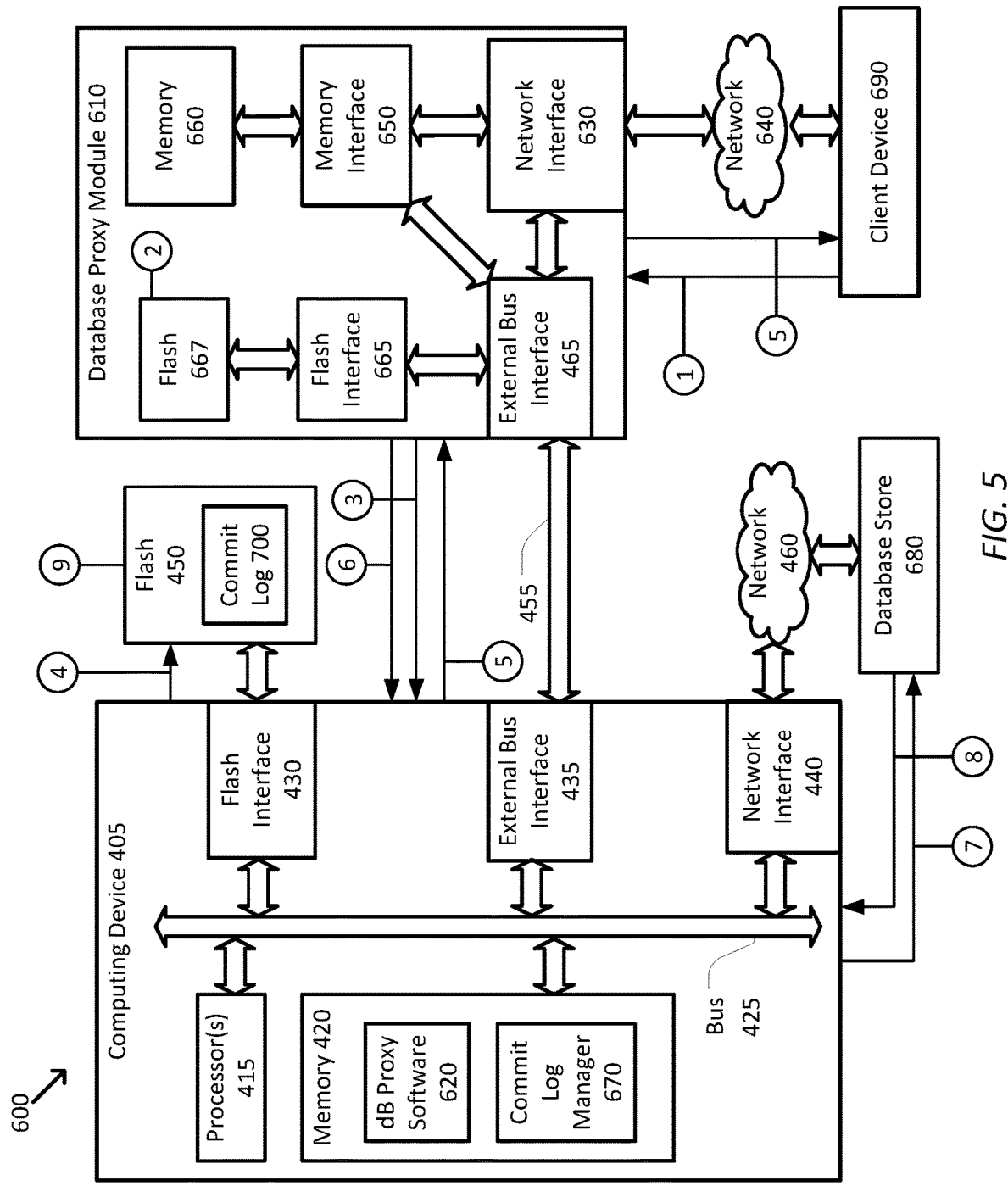
FIG. 5 is a diagram of an operation flow for handling a write request in a database proxy according to various embodiments.

FIG. 5 is a diagram of an operation flow for handling a write request in a database proxy according to various embodiments. As shown, FIG. 5 illustrates operations in a process for handling a write request within database proxy 600. The operations are indicated in FIG. 5 by number callouts extending from arrows indicating transmissions of data in database proxy 600 or from a component of database proxy 600 on which an operation is to be performed.

In operation, database proxy 600 may receive (1) a write request from a client (e.g., client device 690) to add, modify, or remove data from a database (e.g., database store 680). In some embodiments, the write request is received by database proxy module 610 from client device 690 via networks 640.

In response to receiving the write request, database proxy module 610 caches (2) the write request. For example, database proxy module 610 may cache a copy of the write request in cache 145 (which may be located in flash memory device 667 and/or in memory 660).

Concurrently with caching a copy of the write request, database proxy module 610 transmits (3) the write request to computing device 405, in particular commit log manager 670. Commit log manager 670 transmits (4) the write request to flash memory device 450 to add the request into commit log 700. In more detail, commit log manager 670 stores the write request in commit log pages 706. In some examples, commit log manager 670 stores the write request in a location in commit log pages 706 that is determined based on commit log lookup table 704, in particular a mapping of the key of the write request to a location in commit log pages 706. Commit log manager 670 also enqueues a key of the write request onto commit log queue 702 and updates the head and/or tail of commit log queue 702 accordingly. In addition, commit log manager 670 may update the head pointer of commit log queue 702.

Furthermore, in response to storing the write request in commit log pages 706 and queuing the key of the write request in commit log queue 702, commit log manager 670 transmits (5) to client device 690 a signal positively acknowledging successful execution of the write request. That is, success of the write request is acknowledged to client device 690 when the write request is added into commit log 700, without regard to actual execution of the write request or caching of the write request by database proxy module 610.

After database proxy module 610 caches the write request in cache 145, database proxy module 610 may transmit (6) to commit log manager 670 a signal positively acknowledging that the write request is in cache 145. In response to receiving the signal positively acknowledging that the write request is in cache 145, commit log manager 670 may set a caching complete flag associated with the key of the write request, indicating confirmation of the presence of the write request in cache 145. This caching complete flag may be stored in memory 420 and/or commit log 700. Each write request may be associated with its own caching complete flag. Alternatively, each write request key may be associated with its own caching complete flag.

In some embodiments, instead of database proxy module 610 receiving the write request from client device 690, computing device 405 receives the write request from client device 690 (e.g., via networks 460). In these embodiments, commit log manager 670 may add the write request to commit log 700 in flash memory device 450, as in operation (4) described above (omitting operation (3) as unneeded). Concurrently, database proxy software module 620 may transmit the write request to database proxy module 610, which caches the write request as in operation (2) described above. Commit log manager 670 and database proxy module 610 then perform operations (5) and (6), respectively, as described above.

Alternatively, in the embodiments where computing device 405 receives the write request from client device 690, in response to receiving the write request from client device 690, database proxy software module 620 transmits the write request to database proxy module 610. Database proxy module 610 then, concurrently, caches (2) the write request and transmits (3) the write request to commit log manager 670. Commit log manager 670 then adds (4) the write request to commit log 700 in flash memory device 450. Commit log manager 670 and database proxy module 610 then perform operations (5) and (6), respectively, as described above.

Continuing with the operation flow as shown in FIG. 5, computing device 405 (e.g., in particular, database proxy software module 620) transmits (7) the write request to database store 680 for execution. When database store 680 has executed the write request successfully (e.g., data written as requested by the write request), database store 680 transmits (8) a signal to computing device 405 positively acknowledging success of execution of the write request. In response to receiving the signal positively acknowledging successful execution, commit log manager 670 may set a write complete flag associated with the key of the write request, indicating that successful writing of the data in the write request to database store 680. This write complete flag may be stored in memory 420 and/or commit log 700, along with the caching complete flag. Each write request may be associated with its own write complete flag. Thus, each write request has a caching complete flag and a write complete flag. Alternatively, each key may be associated with its own write complete flag. Thus, each key has an associated caching complete flag and a write complete flag.

Commit log manager 670 determines whether the write request has been successfully executed at database store 680 and whether the write request is in cache 145 of database proxy module 610. When commit log manager 670 determines (e.g., confirms) that the write request has been successfully executed at database store 680 and that the write request is in cache 145 of database proxy module 610, commit log manager 670 may determine that the write request no longer needs to persist, and accordingly proceeds to remove the write request from commit log 700. Commit log manager 670 may confirm success of execution of the write request based on the write complete flag, described above, that indicates whether successful acknowledgement of the write of the data to database store 680 is confirmed. Commit log manager 670 may confirm presence of the write request in cache 145 based on the caching complete flag, described above, that indicates whether the write request is in cache 145.

Commit log manager 670 removes (9) the write request from commit log 700 by, for example, dequeuing the key of the write request from commit log queue 702. In some embodiments, when dequeuing of the key of the write request from commit log queue 702, commit log manager 670 may additionally update the head and/or the tail pointers of commit log queue 702 accordingly.

In the above description of the operation flow shown in FIG. 5, database proxy 600 is functioning normally. However, of course it is possible that one or more of the components of database proxy 600 may suffer a failure. For example, if database proxy 600, or in particular computing device 405, fails before a received write request is added into commit log 700, then execution of the write request is never acknowledged to client device 690 and accordingly the write request is considered not received by database proxy 600. In this situation, client device 690 may resend the write request (e.g., retry the write request) or give up on (e.g., abort) the write request.

In a situation where database proxy 600 fails after a received write request is added into commit log 700 and success of execution of the write request is acknowledged to client device 690, commit log manager 670 replays commit log 700 after database proxy 600 restarts to recover write requests left in commit log 700 from before the failure. Commit log manager 670 replays commit log 700 by retrieving (e.g., reading) and handling write requests stored in commit log pages 706. In some examples, the writes are handled in a FIFO order. Commit log manager 670 reads a key from commit log queue 702 and, using commit log lookup table 704, reads the write request stored in commit log pages 706 at a location corresponding to the key that is read.

For a write request read by commit log manager 670 in playback of commit log 700, commit log manager 670 determines whether the write request is in cache 145 and whether the write request has been successfully executed at database store 680. In some examples, when the caching complete flag and the write complete flag are stored in flash memory device 450, commit log manager 670 may first read the flags associated with the key of the write request to determine whether the acknowledgements of caching and successful writing had already been received before the failure. If successful caching and writing are both confirmed based on the flags, commit log manager 670 may remove the write request from commit log 700 in a manner similar to operation (9) described above.

If commit log manager 670 is not able to confirm caching of the write request based on the caching complete flag, commit log manager 670 may query database proxy module 610, using the key of the write request and optionally using also the value or data to be written by the write request, for presence of the write request in cache 145. If database proxy module 610 determines that the write request is in cache 145, database proxy module 610 may transmit a signal positively acknowledging presence of the write request in cache 145, similar to operation (6) described above. If database proxy module 610 determines that the write request is not in cache 145, database proxy module 610 may transmit a signal negatively acknowledging presence of the write request in cache 145 (e.g., acknowledging that the write request is not in cache 145). In response to the negative acknowledgement of caching, commit log manager 670 may transmit the write request to database proxy module 610, where database proxy module 610 caches the write request in cache 145 and transmits to commit log manager 670 a signal positively acknowledging that the write request is in cache 145, similar to operations (2) and (6), respectively, described above. In some examples, commit log manager 670 may alternatively send a command to database proxy module 610 to cache the write request without checking the caching complete flag and/or checking to see if database proxy module has cached the write request.

If commit log manager 670 is not able to confirm writing of the write request in database store 680 based on the write complete flag, commit log manager 670 may query database store 680, using the key of the write request, for execution of the write request. If database store 680 determines that the write request was executed (e.g., data has been written as requested by the write request), database store 680 may transmit a signal positively acknowledging execution of the write request, similar to operation (8) described above. If database store 680 determines that the write request was not executed, database store 680 may transmit a signal negatively acknowledging writing of the write request (e.g., acknowledging that the write request was not written as requested by the write request). In response to the negative acknowledgement of execution, commit log manager 670 may transmit the write request to database store 680 for execution, similar to operation (7) described above. Database store 680, after executing the write request, transmits to commit log manager 670 a signal positively acknowledging execution of the write request, similar to operation (8) described above. In some examples, commit log manager 670 may alternatively send the write request to database store 680 without checking the write complete flag and/or checking to see if database store 680 has previously completed the write request.

In response to confirming caching and execution of the write request based on the acknowledgement signals, commit log manager 670 may remove the write request from commit log 700 in a manner similar to operation (9) described above.

As described above, when replaying commit log 700, write requests may be retrieved and read from commit log 700 by commit log manager 670 in a FIFO order of commit log queue 702. In some embodiments, commit log manager 670 may alternatively retrieved and read write requests from commit log 700 in a last in, first out (LIFO) order as in a stack data structure, with newer write requests that were stored in commit log 700 prior to the failure being handled before older write requests that were stored in commit log 700 prior to the failure. Accordingly, keys of write requests are popped from commit log queue 702 and corresponding write requests are handled in the LIFO order.

When write requests are handled in a LIFO order, it is possible for commit log manager 670 to handle a write request with a given key after handling a newer write request with the same key (e.g., the write requests are attempting to write different values to the same attribute at different times). In this scenario, the newer write request makes the older write request obsolete. Accordingly, when commit log manager 670 gets around to handling the older write request, after determining that the older write request has the same key as a newer write request that has already been handled in the replay, commit log manager 670 may simply remove the older write request from commit log 700 in a manner similar to operation (9) described above, without further processing.

Accordingly, handling of write requests by database proxy 600 allows for acknowledgement of success of a write request to a requesting client as soon as the write request is added into commit log 700, while still guaranteeing integrity of the data in database store 680. That is, the data in database store 680 accurately reflects the write requests made by client devices. Data integrity is guaranteed at least in part via replaying of commit log 700 in case of a failure of database proxy 600.

Figure 6:
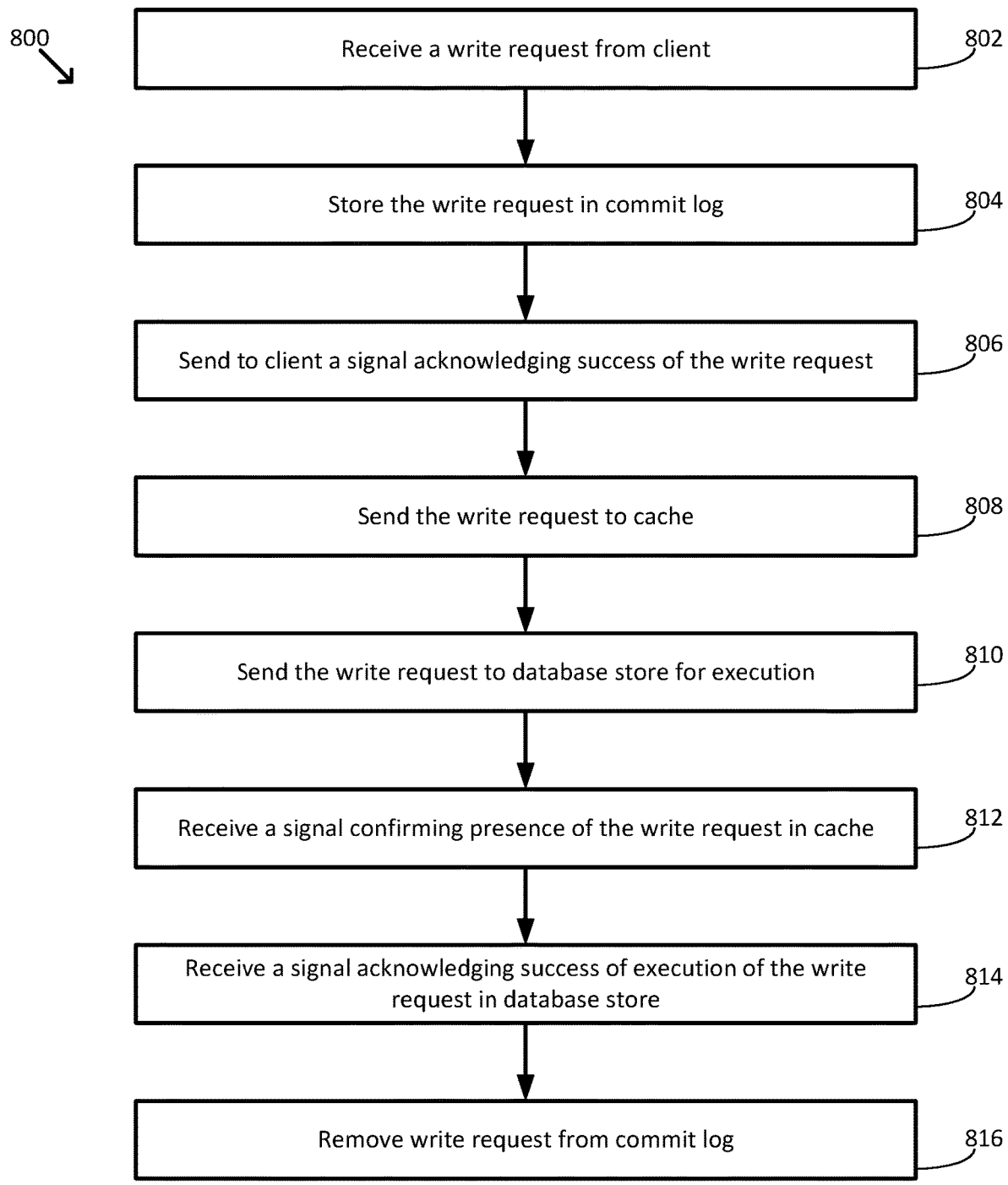
FIG. 6 is a flow diagram of method steps for handling a write request according to various embodiments.

FIG. 6 is a flow diagram of method steps for handling a write request according to various embodiments. Although the operations described for the method is described in conjunction with the systems of FIGS. 1-5, persons of ordinary skill in the art will understand that any system configured to perform the method, in any order, is within the scope of the present disclosure.

As shown, a method 800 begins at step 802, where database proxy 600 receives a write request from a client. Database proxy 600 may receive a write request from a client device 690 via networks 640 or 460. Depending on the implementation, the write request may be first received by database proxy module 610 or computing device 405. For example, database proxy module 610 may receive the write request from client device 690, via networks 640, and transmit the write request to computing device 405.

At step 804, database proxy 600 stores the write request in a commit log. Commit log manager 670 of database proxy 600 transmits the write request to flash memory device 450 to store the write request in commit log 700. At step 806, database proxy 600 sends to the client a signal acknowledging success of the write request. In response to storage of the write request into commit log 700, commit log manager 670 transmits a signal to client device 690 acknowledging success of the write request.

At step 808, database proxy 600 sends the write request to a cache. For example, commit log manager 670 sends the write request to database proxy module 610. Database proxy module 610 of database proxy 600 caches the write request into a cache 145, which may be located in flash memory device 667.

At step 810, database proxy 600 sends the write request to a database store for execution. For database proxy software module 620 transmits the write request to database store 680 to be executed by database store 680.

At step 812, database proxy 600 receives a signal confirming presence of the write request in the cache. Commit log manager 670 may receive from database proxy module 610 a signal positively acknowledging that the write request is in cache 145. Database proxy module 610 may send the positive acknowledgement signal in response to storing the write request in cache 145.

At step 814, database proxy 600 receives a signal confirming execution of the write request in the database store. Commit log manager 670 may receive from database store 680 a signal positively acknowledging that the write request has been written in database store 680. Database store 680 may send the positive acknowledgement signal in response to successful writing of the write request in database store 680.

At step 816, database proxy 600 removes the write request from the commit log. In response to confirmations of caching and writing of the write request based on the signals received in steps 812 and 814 above, commit log manager 670 removes the write request from commit log 700.

As discussed above and further emphasized here, FIG. 6 is merely an example which should not unduly limit the scope of the claims. One of ordinary skill in the art would recognize many variations, alternatives, and modifications. In some embodiments, the order of the steps in FIG. 6 may be different than implied by the flow chart. In some examples, steps 806, 808, and/or 810 may be performed in any order and/or concurrently. In some examples, the signals of steps 812 and/or 814 may be received in any order.

Figure 7:
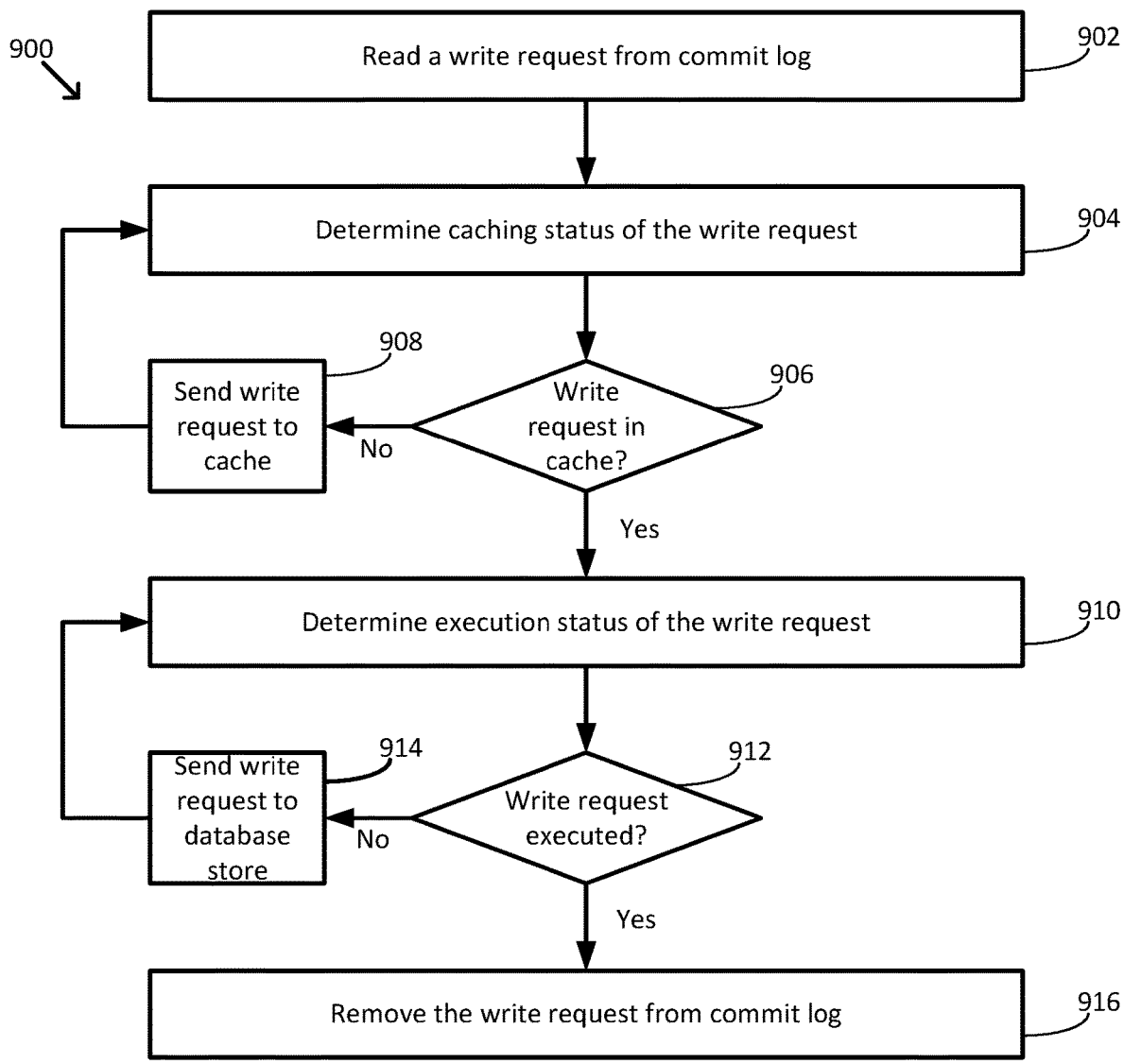
FIG. 7 is a flow diagram of method steps for recovering a write request from a commit log according to various embodiments.

FIG. 7 is a flow diagram of method steps for recovering a write request from a commit log according to various embodiments. Although the operations described for the method is described in conjunction with the systems of FIGS. 1-5, persons of ordinary skill in the art will understand that any system configured to perform the method, in any order, is within the scope of the present disclosure.

As shown, a method 900 begins at step 902, where database proxy 600 reads a write request from a commit log. After a database proxy 600 restarts after a failure of database proxy 600, commit log manager 670 replays the commit log 700 to recover write requests left in commit log 700 from before the failure. In the replaying, commit log manager 670 reads a write request from commit log 700. For example, commit log manager 670 may read a key from commit log queue 702 and read the write request corresponding to the key from commit log pages 706.

At step 904, database proxy 600 determines a caching status of the write request. Commit log manager 670 determines whether the write request is in cache 145. Commit log manager 670 may first read the caching complete flag associated with the write request. If the caching complete flag does not confirm caching of the write request, commit log manager 670 may then query database proxy module 610 for the caching status of the write request.

At step 906, if the write request is not confirmed to be in the cache, method 900 proceeds to step 908, where database proxy 600 sends the write request to the cache. Step 908 is similar to step 808 in FIG. 6. Method 900 then returns to step 904, where commit log manager 670 may again determine the caching status of the write request. After sending the write request to cache 145, commit log manager 670 may also confirm the caching status based on a signal, received from database proxy module 610 in a manner similar to step 812 in FIG. 6, positively acknowledging that the write request is in the cache.

At step 906, if the write request is confirmed to be in the cache, method 900 proceeds to step 910, where database proxy 600 determines an execution status of the write request. Commit log manager 670 determines whether the write request has been executed in database store 680. Commit log manager 670 may first read the write complete flag associated with the write request. If the write complete flag does not confirm execution of the write request, commit log manager 670 may then query database store 680 for the execution status of the write request.

At step 912, if the write request is not confirmed to be written, method 900 proceeds to step 914, where database proxy 600 sends the write request to the database store for writing. Step 914 is similar to step 810 in FIG. 6. Method 900 then returns to step 910, where commit log manager 670 may again determine the execution status of the write request. After sending the write request to database store 680, commit log manager 670 may also confirm the execution status based on a signal, received from database store 680 in a similar manner to step 814 in FIG. 6, positively acknowledging that the write request has been executed.

At step 912, if the write request is confirmed to be executed, method 900 proceeds to step 916 where database proxy 600 removes the write request from the commit log. In response to confirmations of caching and writing of the write request, commit log manager 670 proceeds to remove the write request from commit log 700. Step 916 is similar to step 816 in FIG. 6.

As discussed above and further emphasized here, FIG. 7 is merely an example which should not unduly limit the scope of the claims. One of ordinary skill in the art would recognize many variations, alternatives, and modifications. In some embodiments, the order of the steps in FIG. 7 may be different than implied by the flow chart. In some examples, steps 904, 906, and/or 908 may be performed in any order and/or concurrently relative to steps 910, 912, and/or 914.

As discussed above and further emphasized here, FIGS. 1-3 are merely examples which should not unduly limit the scope of the claims. One of ordinary skill in the art would recognize many variations, alternatives, and modifications. In some embodiments, different architectures are possible for the distribution of the database proxy functionality over various computing devices, database proxy modules, etc. Additional examples of architectural embodiments are disclosed in U.S. patent application Ser. No. 16/661,259, which is incorporated by reference herein in its entirety.

In sum, a database proxy system is configured to persist write requests made to a database store. A write request requested by a client device is added to a commit log stored in a non-volatile memory. In response to the addition of the write request into the commit log, a first signal acknowledging success of the write request is returned to the client device. The write request is also cached in a cache by database proxy implemented in a field-programmable gate array. Based on a confirmation of presence of the write request in the cache and on a second signal acknowledging success of execution of the write request in the database store, the write request may be cleared from the commit log and the cache. If either the confirmation or the second signal is unavailable, the commit log may be replayed to evaluate whether a write request within the commit log is in the cache and has been executed in the database store.

An advantage and technological improvement of the disclosed techniques is that a write request may be acknowledged as successful to a client sooner, while still guaranteeing writing of data as requested by the write request. Accordingly, the integrity of data in the database store is maintained, even as a write request is acknowledged to the client as successful before writing of the data to the datastore according to the write request is confirmed. This allows the client to progress to subsequent operations faster than with prior techniques. Another advantage and technological improvement is that writing of data as requested by write requests that the data base proxy has confirmed to the client is guaranteed in the case of a failure of the database proxy. Accordingly, integrity of the data is maintained even across failures of the database proxy.

1. In some embodiments, a method of processing database write requests using a database proxy comprises receiving a database write request from a client via a network interface of a computing device; storing the database write request in a commit log in a first non-volatile memory device coupled to the computing device; in response to storing the database write request in the commit log, returning to the client a signal acknowledging success of the database write request; storing the database write request in a cache in a second non-volatile memory device coupled to a database proxy module located in a field programmable gate array; causing the database write request to be written in a database store; and based on a first determination that the database write request is stored in the cache and on a second determination that the database write request is written in the database store, removing the database write request from the commit log.

2. The method of clause 1, wherein storing the database write request in the commit log and storing the database write request in the cache are performed concurrently.

3. The method of clauses 1 or 2, wherein the signal acknowledging success of the database write request is returned to the client without regard to whether the database write request is written in the database store.

4. The method of any of clauses 1-3, wherein the first non-volatile memory device and the second non-volatile memory device are a common non-volatile memory device shared by the computing device and the database proxy module.

5. The method of any of clauses 1-4, further comprising making the first determination based on a signal from the database proxy module confirming storage of the database write request in the cache.

6. The method of any of clauses 1-5, further comprising making the second determination based on a signal from the database store confirming that the database write request is written in the database store.

7. The method of any of clauses 1-6, further comprising retrieving a second database write request from the commit log; and based on a third determination that the second database write request is stored in the cache and on a fourth determination that the second database write request is written in the database store, removing the second database write request from the commit log.

8. The method of any of clauses 1-7, further comprising retrieving a third database write request from the commit log; and based on a fifth determination that the third database write request is not stored in the cache, storing the third database write request in the cache.

9. The method of any of clauses 1-8, further comprising, based on a sixth determination that the third database write request is not written in the database store, causing the third database write request to be written in the database store.

10. The method of any of clauses 1-9, further comprising retrieving a fourth database write request from the commit log; retrieving a fifth database write request from the commit log, wherein the fifth database write request has a same key as the fourth database write request, and wherein the fifth database write request is older than the fourth database write request; removing the fifth database write request from the commit log without regard to a determination whether the fifth database write request is stored in the cache and without regard to a determination whether the fifth database write request is written in the database store.

11. In some embodiments, a database proxy comprises a computing device including one or more processors, memory, and a network interface coupling the database proxy to one or more networks; and a hardware-accelerated database proxy module, wherein the database proxy module is located in a field programmable gate array; wherein the database proxy is configured to receive a database write request from a client via the network interface; store the database write request in a commit log in a first non-volatile memory device accessible to the computing device; in response to storing the database write request in the commit log, return to the client a signal acknowledging success of the database write request; store the database write request in a cache in a second non-volatile memory device accessible to the database proxy module; cause the database write request to be written in a database store; and based on a first determination that the database write request is stored in the cache and on a second determination that the database write request is written in the database store, remove the database write request from the commit log.

12. The database proxy of clause 11, wherein the database proxy is configured to store the database write request in the commit log and store the database write request in the cache concurrently.

13. The database proxy of clauses 11 or 12, wherein the database proxy is configured to return the signal acknowledging success of the database write request to the client without regard to whether the database write request is written in the database store.

14. The database proxy of any of clauses 11-13, wherein the first non-volatile memory device and the second non-volatile memory device are a common non-volatile memory device shared by the computing device and the database proxy module.

15. The database proxy of any of clauses 11-14, wherein the database proxy is configured to make the first determination based on a signal from the database proxy module confirming storage of the database write request in the cache.

16. The database proxy of any of clauses 11-15, wherein the database proxy is configured to make the second determination based on a signal from the database store confirming that the database write request is written in the database store.

17. The database proxy of any of clauses 11-16, wherein the database proxy is further configured to retrieve a second database write request from the commit log; and based on a third determination that the second database write request is stored in the cache and on a fourth determination that the second database write request is written in the database store, remove the second database write request from the commit log.

18. The database proxy of any of clauses 11-17, wherein the database proxy is further configured to retrieve a third database write request from the commit log; and based on a fifth determination that the third database write request is not stored in the cache, store the third database write request in the cache.

19. The database proxy of any of clauses 11-18, wherein the database proxy is further configured to, based on a sixth determination that the third database write request is not written in the database store, cause the third database write request to be written in the database store.

20. The database proxy of any of clauses 11-19, wherein the database proxy is further configured to retrieve a fourth database write request from the commit log; retrieve a fifth database write request from the commit log, wherein the fifth database write request has a same key as the fourth database write request, and wherein the fifth database write request is older than the fourth database write request; remove the fifth database write request from the commit log without regard to a determination whether the fifth database write request is stored in the cache or to a determination whether the fifth database write request is written in the database store.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method of processing database write requests using a database proxy, the method comprising:
    receiving a request to write data to a database from a client via a network interface of a computing device;
    storing the request in a commit log in a first non-volatile memory device coupled to the computing device, the commit log storing the request for replaying the request if a failure of the database proxy occurs;
    in response to storing the request in the commit log, sending to the client a signal indicating that the data is successfully written to the database according to the request irrespective of whether the data is successfully written to the database according to the request;
    storing the request in a cache in a second non-volatile memory device concurrently while storing the request in the commit log, the second non-volatile memory device being coupled to a database proxy module;
    sending the cached request to the database for execution based on determining whether a hash value for the cached request falls within a range of hash values assigned to the database proxy, wherein the hash value is generated based on an index used by the cached request to reference data;
    based on determining that the request is stored in the cache and that the data is written in the database, removing the request from the commit log;
    retrieving a second write request from the commit log;
    retrieving a third write request from the commit log, wherein the third write request has a same key as the second write request, and wherein the third write request is older than the second write request; and
    removing the third write request from the commit log without regard to determining whether the third write request is stored in the cache and without regard to determining whether the third write request is written in the database.

2. The method of claim 1, wherein the first non-volatile memory device and the second non-volatile memory device are a common non-volatile memory device shared by the computing device and the database proxy module.

3. The method of claim 1, further comprising determining that the request is stored in the cache based on receiving a signal from the database proxy module confirming storage of the request in the cache.

4. The method of claim 1, further comprising determining that the data is written in the database based on receiving a signal from the database confirming that the data is written in the database.

5. The method of claim 1, further comprising:
    based on determining that the second write request is stored in the cache and that the second write request is written in the database, removing the second write request from the commit log.

6. The method of claim 1, further comprising:
    based on determining that the second write request is not stored in the cache, storing the second write request in the cache.

7. The method of claim 6, further comprising:
    based on determining that the second write request is not written in the database, causing the second write request to be written in the database.

8. A database proxy comprising:
    a computing device including:
        one or more processors;
        memory; and
        a network interface coupling the database proxy to one or more networks; and
    a database proxy module;
    wherein the database proxy is configured to:
        receive a request to write data to a database from a client via the network interface;
        store the request in a commit log in a first non-volatile memory device accessible by the computing device, the commit log storing the request for replaying the request if a failure of the database proxy occurs;
        in response to storing the request in the commit log, send to the client a signal indicating that the data is successfully written to the database according to the request;
        store the request in a cache in a second non-volatile memory device concurrently while storing the request in the commit log, the second non-volatile memory device being accessible by the database proxy module;
        send the request to the database for execution based on determining whether a hash value for the request falls within a range of hash values assigned to the database proxy, wherein the hash value is generated based on an index used by the request to reference data;
        based on determining that the request is stored in the cache and that the data is written in the database, remove the request from the commit log;

retrieve a second write request from the commit log;

retrieve a third write request from the commit log, wherein the third write request has a same key as the second write request, and wherein the third write request is older than the second write request; and remove the third write request from the commit log without regard to determining whether the third write request is stored in the cache or whether the third write request is written in the database.

9. The database proxy of claim 8, wherein the first non-volatile memory device and the second non-volatile memory device are a common non-volatile memory device shared by the computing device and the database proxy module.

10. The database proxy of claim 8, wherein the database proxy is configured to determine based on a signal received from the database proxy module confirming storage of the request in the cache.

11. The database proxy of claim 8, wherein the database proxy is configured to determine based on a signal received from the database confirming that the data is written in the database.

12. The database proxy of claim 8, wherein the database proxy is further configured to:

based on determining that the second write request is stored in the cache and that the second write request is written in the database, remove the second write request from the commit log.

13. The database proxy of claim 8, wherein the database proxy is further configured to:

based on determining that the second write request is not stored in the cache, store the second write request in the cache.

14. The database proxy of claim 13, wherein the database proxy is further configured to:

based on determining that the second write request is not written in the database, cause the second write request to be written in the database.

* * * * *

UNITED STATES PATENT AND TRADEMARK OFFICE
CERTIFICATE OF CORRECTION

| | |
|---|---|
| PATENT NO. | : 11,429,595 B2 |
| APPLICATION NO. | : 16/837966 |
| DATED | : August 30, 2022 |
| INVENTOR(S) | : Amarnath Vishwakarma et al. |

It is certified that error appears in the above-identified patent and that said Letters Patent is hereby corrected as shown below:

On the Title Page

Item (72), Column 1, Inventors: delete "Syam Prasad" and insert --Syam Prasad Tummalacharla--

Signed and Sealed this
Eighth Day of August, 2023

Katherine Kelly Vidal
*Director of the United States Patent and Trademark Office*